(12) United States Patent
Rayzel

(10) Patent No.: US 11,013,217 B2
(45) Date of Patent: May 25, 2021

(54) POULTRY MANAGEMENT SYSTEM AND METHOD OF TRANSPORTING EGGS IN A POULTRY MANAGEMENT SYSTEM

(71) Applicant: BIG DUTCHMAN INTERNATIONAL GmbH, Vechta (DE)

(72) Inventor: Clovis Rayzel, Holland, MI (US)

(73) Assignee: BIG DUTCHMAN INTERNATIONAL GMBH, Vechta (DE)

(*) Notice: Subject to any disclaimer, the term of this patent is extended or adjusted under 35 U.S.C. 154(b) by 698 days.

(21) Appl. No.: 15/584,170

(22) Filed: May 2, 2017

(65) Prior Publication Data

US 2017/0318790 A1    Nov. 9, 2017

(30) Foreign Application Priority Data

May 3, 2016   (DE) ................ 20 2016 102 333.5 U (51) Int. Cl.
| | |
|---|---|
| *A01K 31/16* | (2006.01) |
| *A01K 31/04* | (2006.01) |
| *A01K 31/22* | (2006.01) |

(52) U.S. Cl.
CPC ............ *A01K 31/165* (2013.01); *A01K 31/16* (2013.01); *A01K 31/04* (2013.01); *A01K 31/22* (2013.01)

(58) Field of Classification Search
CPC ...... A01K 31/00; A01K 31/002; A01K 31/04; A01K 31/005; A01K 31/06; A01K 31/07; A01K 31/08; A01K 31/12; A01K 31/16; A01K 31/165; A01K 1/0245

USPC ......................................................... 119/337
See application file for complete search history.

(56) References Cited

U.S. PATENT DOCUMENTS

| | | | | |
|---|---|---|---|---|
| 2,843,086 A | * | 7/1958 | Graham ................. | A01K 31/04 119/458 |
| 3,062,185 A | * | 11/1962 | Kurtz ..................... | A01K 31/16 119/336 |
| 3,109,413 A | * | 11/1963 | Patchett ............... | A01K 31/165 119/337 |
| 3,124,102 A | * | 3/1964 | Kurtz et al. .......... | A01K 31/16 119/337 |
| 3,139,065 A | * | 6/1964 | Willauer, Jr. ......... | A01K 31/16 119/337 |
| 3,339,528 A | * | 9/1967 | Summerour ......... | A01K 31/165 119/337 |
| 3,485,214 A | * | 12/1969 | Burkholder .......... | A01K 31/165 119/337 |

(Continued)

FOREIGN PATENT DOCUMENTS

| | | |
|---|---|---|
| DE | 19948057 | 4/2001 |
| DE | 202004003194 | 6/2004 |
| EP | 2989891 | 3/2016 |

*Primary Examiner* — Magdalena Topolski
*Assistant Examiner* — Morgan T Barlow
(74) *Attorney, Agent, or Firm* — Price Heneveld LLP (57) ABSTRACT

A poultry management system having at least one animal holding area with a holding area floor for a poultry animal occupying the animal holding area and a conveyor comprising a conveyor belt having an upper track and a lower track disposed below the upper track. The lower track is disposed adjacent to the animal holding area and is adapted to receive one or more eggs deposited by the poultry animal occupying the animal holding area and transfer the one or more eggs for further processing.

20 Claims, 6 Drawing Sheets

(56) References Cited

U.S. PATENT DOCUMENTS

| | | | | |
|---|---|---|---|---|
| 3,552,359 A * | 1/1971 | Graves | A01K 31/17 | 119/336 |
| 3,581,709 A * | 6/1971 | Van Huis | A01K 31/17 | 119/531 |
| 3,662,714 A * | 5/1972 | Poon | A01K 1/0135 | 119/449 |
| 3,704,688 A * | 12/1972 | Wilson | A01K 45/00 | 119/439 |
| 3,738,077 A * | 6/1973 | Leach | B65B 1/32 | 177/120 |
| 3,789,802 A * | 2/1974 | Conley | A01K 31/165 | 119/337 |
| 3,791,348 A * | 2/1974 | Marnett | A01K 1/0117 | 119/482 |
| 3,978,819 A * | 9/1976 | Lovitt | A01K 1/035 | 119/458 |
| 4,008,690 A * | 2/1977 | Van Huis | A01K 31/005 | 119/845 |
| 4,226,211 A * | 10/1980 | Barrentine | A01K 31/165 | 119/337 |
| 4,416,219 A * | 11/1983 | Dill | A01K 31/165 | 119/337 |
| 4,653,430 A * | 3/1987 | Mass | A01K 31/005 | 119/337 |
| 4,766,849 A * | 8/1988 | Kawabata | A01K 31/165 | 119/337 |
| 4,936,257 A * | 6/1990 | Kuhlmann | A01K 31/04 | 119/442 |
| 5,174,242 A * | 12/1992 | Takeuchi | A01K 31/005 | 119/439 |
| 5,570,657 A * | 11/1996 | Kuhlmann | A01K 31/007 | 119/458 |
| 5,660,145 A * | 8/1997 | Rumbaugh | A01K 31/16 | 119/440 |
| 6,454,101 B1 * | 9/2002 | Doornekamp | A01K 43/00 | 198/779 |
| 8,019,125 B2 * | 9/2011 | Nadreau | B07C 5/34 | 119/845 |
| 8,127,916 B2 * | 3/2012 | Mix | A01K 31/165 | 119/337 |
| 9,145,265 B2 * | 9/2015 | Kalkhoff | A01K 43/00 | |
| 2004/0144326 A1 * | 7/2004 | Smith | A01K 31/16 | 119/337 |

\* cited by examiner

POULTRY MANAGEMENT SYSTEM AND METHOD OF TRANSPORTING EGGS IN A POULTRY MANAGEMENT SYSTEM

CROSS-REFERENCE TO FOREIGN PRIORITY APPLICATION

The present application claims the benefit under 35 U.S.C. § 119(b) of German Application No. DE 202016102333.5 filed May 3, 2016, entitled "Poultry Management System and Method for Transporting Eggs in a Poultry Management System."

FIELD OF THE INVENTION

The present disclosure relates to a poultry management system and a method of transporting eggs in a poultry management system.

BACKGROUND OF THE INVENTION

Various poultry management systems are known for keeping poultry, such as laying hens, in particular. While keeping poultry in cages is still allowed in some countries, in other areas, it is now preferred to use, for example, aviaries. An example of an aviary for keeping poultry is described in DE 20 2004 003 194 U1. Especially poultry management systems are known in which several poultry keeping devices, such as cages and/or aviaries, are arranged on several levels, each comprising several animal holding areas arranged next to each other. Such poultry management systems are usually located in a house or a hall, wherein the house may also be a mobile stable. It is preferred that walkways, usually arranged parallel to each other, are arranged between different rows of poultry keeping devices, which are preferably arranged on several levels.

Poultry management systems may be designed as open systems so that the animals are able to move freely not only within the individual holding areas or on one level, but also in the house and/or the hall. In most cases, the house floor, especially in the walkways, is arranged as scrabbling space for the animals, preferably covered with litter. However, this type of poultry management has the disadvantage that the animals freely come into contact with areas and/or elements outside the animal holding areas in the poultry keeping devices and may contaminate them, inter alia, with their manure. Especially in the keeping of laying hens, the ability of the animals to move freely may also lead to a contamination of and/or damage to eggs. The contamination of conveyors for transporting the eggs out of the poultry management system may further have the consequence that the eggs will no longer, or only with a delay, roll from the animal holding area to the conveyors and be transported outside, which, in turn, increases the probability of the animals contaminating and/or damaging the eggs.

Therefore, the invention is based on the object of providing a poultry management system and a method of transporting eggs in a poultry management system which reduce or eliminate one or several of the above mentioned disadvantages. It is, in particular, an object of the present invention to provide a poultry management system and a method of transporting eggs in a poultry management system which, in a space and cost saving manner, reduce the contamination and/or damaging of eggs and/or increase the hygiene in the house.

SUMMARY OF THE INVENTION

This object is achieved by means of a poultry management system comprising at least one animal holding area with a holding area floor and a conveyor comprising a conveyor belt with an upper belt and a lower belt, wherein the lower belt is arranged and designed to receive eggs from the animal holding area.

According to the invention, in addition to the at least one animal holding area with a holding area floor, the poultry management system comprises a conveyor, which is designed as a belt conveyor with a preferably continuous conveyor belt having an upper belt and a lower belt. Such a conveyor is also referred to as a continuous conveyor. Usually, the conveyor will preferably also comprise a deflection element and/or a drive element, which may, for example, be designed as an idler roller or drive roller. The drive element preferably serves the purpose of driving the conveyor belt. The upper belt can also be referred to as upper run. The lower belt can also be referred to as lower run. Below the upper belt and/or below the lower belt, support elements, such as support rollers, may be arranged.

Preferably, the conveyor runs parallel to a row of poultry keeping devices, in particular parallel to a walkway between different rows of poultry keeping devices. The holding area floor of at least one animal holding area is preferably slanted, in particular downwards, towards the conveyor. The animal holding area preferably comprises a nest area which is designed and arranged in such a way that it offers the animals a comfortable environment, especially for laying eggs. Furthermore, the animal holding area preferably comprises a roost a feed supply, a water supply, and/or additional installations required for species appropriate poultry keeping.

The conveyor of the poultry management system is arranged and designed in such a way that the lower belt can receive eggs from the animal holding area.

It is furthermore preferred that the eggs are transported by means of the lower belt of the conveyor in a lower belt transport direction and, furthermore, are preferably transferred to an intermediate conveyor or directly to a machine which further processes the eggs. The upper belt transport direction and the lower belt transport direction are preferably opposite to each other.

The invention is, inter alia, based on the finding that the animals often move from a scrabbling space between the animal holding areas, which are mostly arranged in rows, to the animal holding areas and back and, in doing so, often cross over the egg conveyor located in between.

The use according to the invention of the lower belt of the conveyor for receiving, and, preferably, transporting the eggs allows that the eggs are, at the same time, covered by the upper belt located above the lower belt. Thus, it usually can be prevented or at least significantly reduced that, when crossing the conveyor, the animals step on eggs on the lower belt and damage them, since access to the eggs on the lower belt is prevented, or at least hindered, by the upper belt. Furthermore, using the lower belt for receiving the eggs from the animal holding area has the advantage that the upper belt significantly reduces a contamination of the eggs on the lower belt.

In a preferred embodiment, the upper belt is arranged and designed to receive poultry manure. Preferably, the poultry manure can be transported by means of the upper belt in an upper belt transport direction and, furthermore, can preferably be transferred to a subsequent intermediate conveyor or directly to a machine which further processes the manure, for example, a manure drying tunnel. This embodiment has the advantage that it has a particularly compact design and is a space and cost saving solution, since the same conveyor can be used both for receiving poultry manure and for receiving eggs.

Compared to a static, extensive covering of a conveyor belt for eggs with, for example, a sheet metal structure or wooden or plastic plates, the use of the upper belt as a manure belt has the advantage that any dirt that is created, for example manure, can be transported away on a regular basis. On static cover surfaces, however, large amounts of dirt can build up during one laying period and stick together to form larger dirt plates, which, if they fall off the cover and end up, for example, in an area through which the eggs from the animal holding area usually roll onto a conveyor belt for eggs, might prevent or hinder and/or delay precisely this egg transport. As a consequence, the animals might step on the collected eggs and thus damage the eggs and/or contaminate the eggs more.

Furthermore, the invention is based on the knowledge that the hygiene of a static cover with a large surface area might also have a negative impact on animal health, since manure can accumulate on the cover and the animals will touch it again and again, especially when crossing over, which might impact the health of the balls of their feet, in particular.

The use of the upper belt of the conveyor both for covering the lower belt, which receives the eggs, and as a manure belt, with which manure and/or other dirt can be received and, preferably, be transported away, allows for a clear improvement of the house hygiene.

Preferably, a side wall is arranged on a side of the lower belt facing away from the animal holding area. In this case, in particular, the lower belt receiving the eggs can also be referred to as an egg channel. The side wall may, preferably, be designed as one continuous piece or with gaps, for example with holes or openings, respectively. The gaps in the side wall are preferably dimensioned in such a way that the eggs cannot fit through them. The side wall can, for example, be designed as a grating element, for example as grating wherein bars extend at a distance from each other in one direction (for example horizontally or vertically), or as grating wherein bars extend at a distance from each other in two or more directions. Such grating may, for example, be designed as grating with crossed bars.

In another preferred embodiment, a support element is arranged below the lower belt. This support element preferably serves to prevent any unwanted high degree of bending and/or any unwanted high degree of sagging of the lower belt even if the belt is subjected to high weights or loads. The support element is also preferably designed as a grating element.

In a particularly preferred embodiment, the side wall, the support element, and/or the holding area floor are operably connected with each other, such as designed as one piece. For example, a holding area floor, which is preferably designed as grating, may be dimensioned or extended in such a way that the extension forms the support element and the side wall.

Furthermore, it is particularly preferable that the lower belt is arranged at the height of the holding area floor or below. The lower belt may, in particular, be arranged at the height of the end of the holding area floor facing towards and/or adjacent to the conveyor, or below.

Another preferred embodiment is characterized in that a preferably maximum, distance in an essentially vertical direction between the upper belt and the lower belt corresponds to no more than three times the average egg diameter, and preferably to no more than twice the average egg diameter. As used herein, the term "egg diameter" means a maximum diameter of the egg in an essentially vertical direction while the egg is in a lying position. As used herein, the term "average egg diameter" means an egg diameter which corresponds to the arithmetic average of a plurality of egg diameters.

This configuration has the advantage that the distance between the upper belt and the lower belt of the conveyor is dimensioned in such a way that the eggs reach the space between the upper belt and the lower belt essentially undamaged and preferably can be transported, while the animals are prevented from accessing this space in between the belts from accessing the lower belt.

In another embodiment, it is preferred that a poultry holding element is arranged above the upper belt, wherein the poultry holding element, or at least sections thereof, is arranged and designed in such a way that the poultry manure can reach the upper belt. Preferably, at least sections or parts of the poultry holding element are permeable to the poultry manure. At the same time, the poultry holding element is preferably designed and arranged in such a way that the animals can stay on that element or cross the conveyor via the poultry holding element. Preferably, the poultry holding element is arranged in a vertical direction at a distance from the upper belt, wherein this gap is preferably suitable for receiving the dirt of two subsequent days without allowing the manure and/or dirt to extend onto the poultry holding element and without allowing the animals to get into contact with their own excrements. It is furthermore preferable that the poultry holding element, in particular, in its entirety or sections thereof, is arranged as a grating element and/or a roost.

This configuration has the advantage that most of the manure and dirt reach the upper belt through the poultry holding element. Thus, the poultry holding element remains relatively clean, which allows for an improvement of the house hygiene and, in particular, of the health of the balls of the feet.

In a preferred embodiment, the upper belt and/or the poultry holding element are arranged above the holding area floor.

Another preferred embodiment comprises a guiding element which is designed and arranged to transport eggs transported on the lower belt out of the conveyor. Contrary to what applies to a transport on the upper belt, eggs transported on the lower belt must be moved out of the space between the upper belt and the lower belt before the lower belt is deflected upwards by the deflection element or the drive element and becomes the upper belt. In this embodiment, this is achieved through a guiding element, which, accordingly, is designed and arranged to transport the eggs out of the space between the lower belt and the upper belt.

The guiding element may, preferably, be designed as one continuous piece or with gaps, for example with holes or openings, respectively. The gaps in the guiding element are preferably dimensioned in such a way that the eggs cannot fit through them. The guiding element can, for example, be designed as a grating element, for example as grating wherein the bars extend at a distance from each other in one direction (for example horizontally or vertically), or as grating wherein the bars extend at a distance from each other in two or more directions. Such grating may, for example, be designed as grating with crossed bars.

The guiding element is preferably arranged in the lower belt transport direction at an angle to the lower belt transport direction. Preferably, the guiding element is arranged and designed in such a way that eggs transported on the lower belt are transported out to the side, at an angle to the lower belt transport direction. Furthermore, it is preferable that the guiding element is arranged and designed in such a way that the eggs are transported out of the conveyor at the level of the lower belt.

Furthermore, the guiding element is preferably arranged in a transfer section of the conveyor, which is preferably arranged at an end of the lower belt that is downstream in the lower belt transport direction.

In another preferred embodiment, the poultry management system comprises an intermediate conveyor which is arranged and designed to receive eggs transported out of the conveyor. The intermediate conveyor may preferably be arranged in such a way that it connects to the transfer section of the conveyor, preferably in an essentially orthogonal direction to the lower belt transport direction. Furthermore, the intermediate conveyor is preferably designed to transport the eggs received from the conveyor and transfer them onto a subsequent conveyor.

The intermediate conveyor preferably has a transport direction which is essentially parallel to the lower belt transport direction. Furthermore, it is preferable that the intermediate conveyor is arranged and designed in such a way that the intermediate conveyor extends in the lower belt transport direction beyond the conveyor.

The intermediate conveyor may preferably comprise a continuous conveyor belt with an upper belt and a lower belt, i.e., a belt conveyor, or arranged as a rod conveyor. Preferably, the intermediate conveyor comprises a deflection element. Preferably, the intermediate conveyor comprises a deflection element, r a drive element, or a support element for supporting the upper belt, and the lower belt of the intermediate conveyor.

In another preferred embodiment, that the upper belt of the intermediate conveyor is preferably arranged essentially at the same height as or slightly below the lower belt of the conveyor. In the embodiment, it is preferable that eggs transported on the lower belt of the conveyor are transferred onto the upper belt of the intermediate conveyor, preferably by means of a guiding element. Preferably, the transport direction of the intermediate conveyor corresponds to the upper belt transport direction of the intermediate conveyor, since the intermediate conveyor is preferably arranged and designed for transporting the eggs on the upper belt. To this end, an arrangement of the upper belt of the intermediate conveyor at essentially the same height as the lower belt of the conveyor or slightly below the lower belt of the conveyor is advantageous.

In another preferred embodiment, a distance between the intermediate conveyor and the conveyor, preferably a distance between the upper belt of the intermediate conveyor and the lower belt of the conveyor, is smaller than an average egg diameter, preferably smaller than 50%, and in particular smaller than 20%, of an average egg diameter.

Furthermore, it is advantageous to dimension the distance between the intermediate conveyor and the conveyor, in particular the distance between the upper belt of the intermediate conveyor and the lower belt of the conveyor, in such a way that eggs cannot fit through entirely or partially so that the risk of the eggs falling down and/or getting stuck can be reduced.

In another preferred embodiment, the intermediate conveyor and/or a subsequent conveyor is arranged directly or slightly below the lower belt of the conveyor and extends beyond the side of the lower belt of the conveyor, preferably on one side.

An intermediate conveyor and/or a subsequent conveyor may also be arranged below the lower belt in such a way that eggs can be passed on to the intermediate conveyor and/or the subsequent conveyor over the side of the lower belt of the conveyor. To this end, the intermediate conveyor and/or subsequent conveyor is preferably arranged in an orthogonal direction to the lower belt transport direction, wider than the lower belt and/or adjacent to the lower belt. Preferably, a distance in horizontal direction between the intermediate conveyor and/or the subsequent conveyor does not exist or is so short that the eggs cannot fit through and/or cannot get stuck in this gap or space in between.

The conveyor belt can preferably be designed as a textile conveyor belt, which can, for example, be woven. Preferably, the conveyor belt is designed as a woven fabric belt.

The conveyor belt consists preferably of plastic or comprises plastic. Especially thermoplastic, such as polypropylene, is a preferred material for the conveyor belt.

The conveyor belt preferably has a width of at least 10 cm, in particular at least 20 cm, 25 cm or 30 cm.

In another preferred embodiment, a first side of the conveyor belt which forms a top side of the upper belt is designed differently from a second side of the conveyor belt which forms a top side of the lower belt or a bottom side of the upper belt, respectively. Preferably, the first side of the conveyor belt is designed essentially smooth, water repellent, dirt repellent, or cleaning agent proof. The first side of the conveyor belt may, for example, be coated accordingly, for example with a plastic coating. The second side of the conveyor belt can, for example, have a structure which reduces a movement of the eggs relative to the conveyor belt during their transport in the lower belt transport direction. The conveyor belt may, for example, be designed as a woven fabric belt, which, on its first side, has a coating, which is designed for the transport of manure, in particular.

The conveyor belt is preferably designed essentially continuous, without any openings through the conveyor belt, especially not in an area serving the transport of eggs and/or manure. Thus, a build-up of manure and/or dirt on the second side of the conveyor belt can be reduced or prevented.

According to another aspect of the invention, the above mentioned object is achieved by means of a method of transporting eggs in a poultry management system, in particular in a poultry management system as described above, comprising preferably the steps of providing a poultry management system as described above, transporting the eggs from an animal holding area on a lower belt of a conveyor belt of a conveyor in a lower belt transport direction, and furthermore, preferably transporting poultry manure on an upper belt of a conveyor belt of a conveyor in an upper belt transport direction.

The method according to the invention and its possible embodiment comprise features or respectively method steps which make it, in particular, suitable for being used for a poultry management system according to the invention and its embodiments.

Regarding the advantages, possible versions and realization details of this additional aspect of the invention and its embodiments, reference is made to the previous description of the respective device features.

According to another aspect of the invention, the object mentioned above is achieved through the use of a conveyor comprising a conveyor belt with an upper belt and a lower belt for transporting eggs in a poultry management system, in particular in a poultry management system as described above, wherein the lower belt of the conveyor is arranged and designed to receive eggs from the animal holding area.

Regarding the advantages, possible versions and realization details of this additional aspect of the invention and its embodiments, reference is made to the previous description of the respective device features.

As regards the advantages, embodiment variants, and embodiment details of the method according to the present disclosure and its possible further developments, reference is made to the description provided herein of the respective features, as will be understood and appreciated by those skilled in the art upon studying the following specification, claims, and appended drawings.

BRIEF DESCRIPTION OF THE DRAWINGS

Exemplary embodiments of the invention are described by means of the attached figures.

The following is shown in

DETAILED DESCRIPTION OF THE PREFERRED EMBODIMENTS

Figure 1:
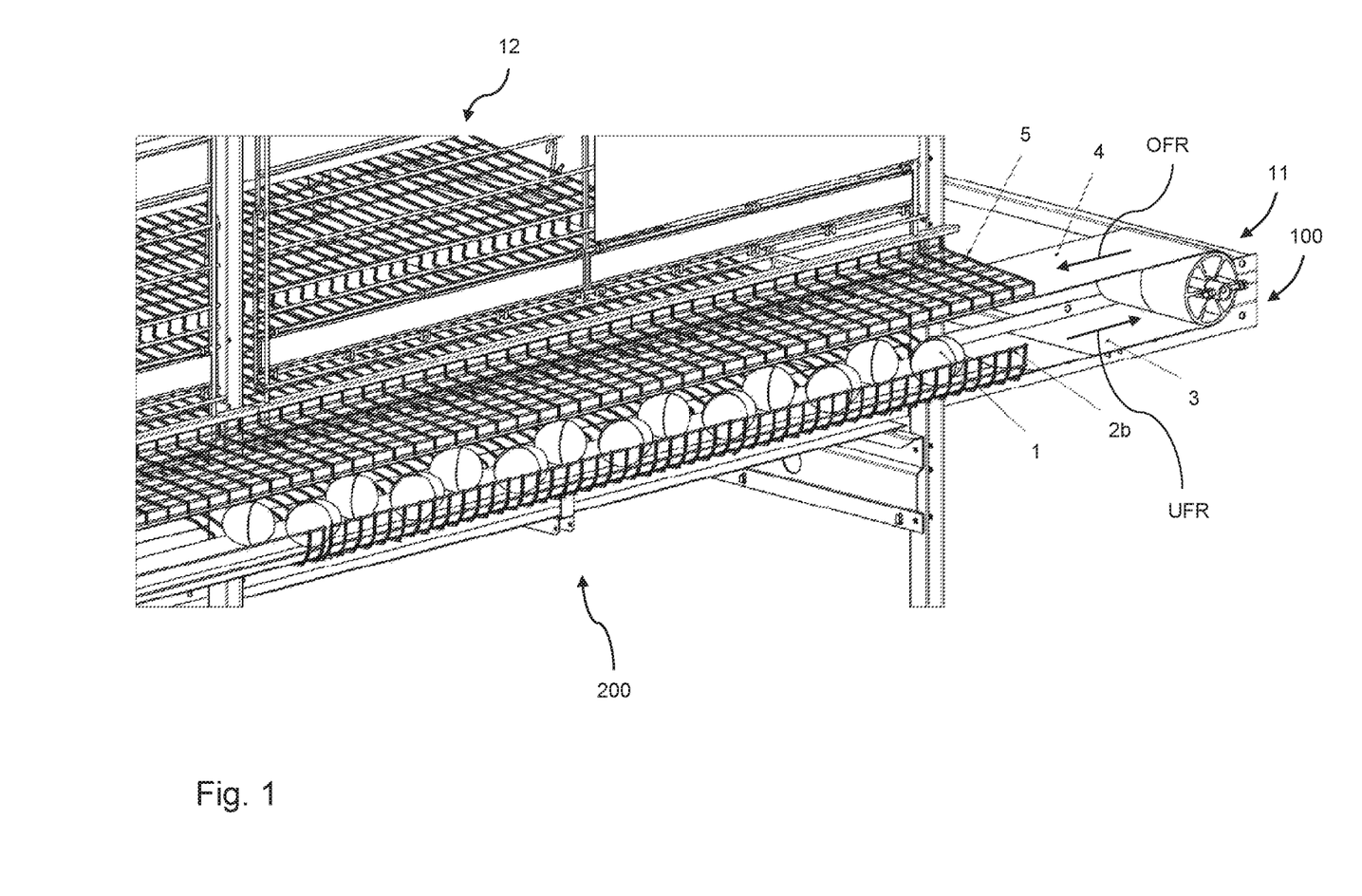
FIG. 1 is a three-dimensional view of an exemplary embodiment of a part of a poultry management system.
Figure 2:
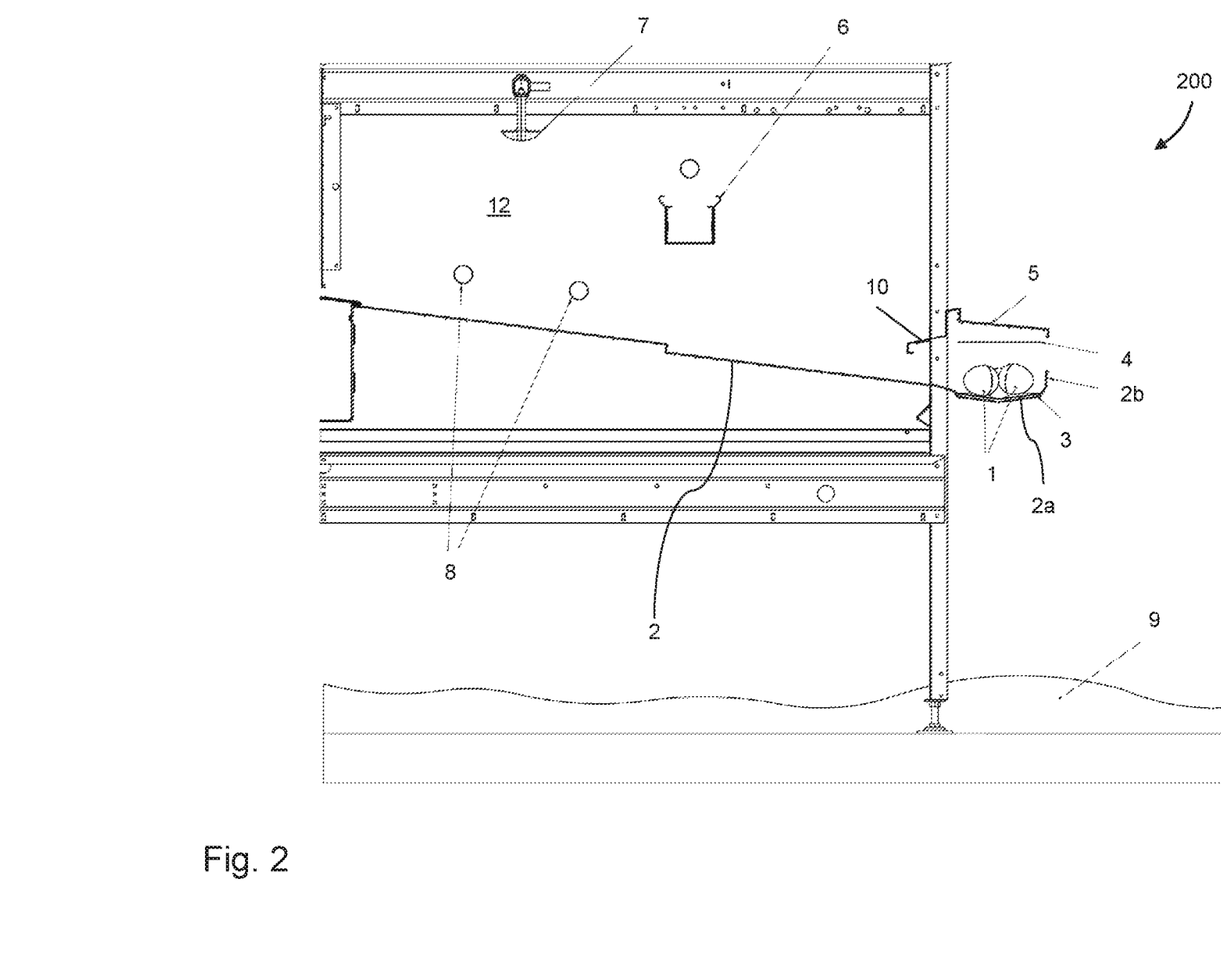
FIG. 2 is a cross-section through the part of the poultry management system according to FIG. 1.
Figure 3:
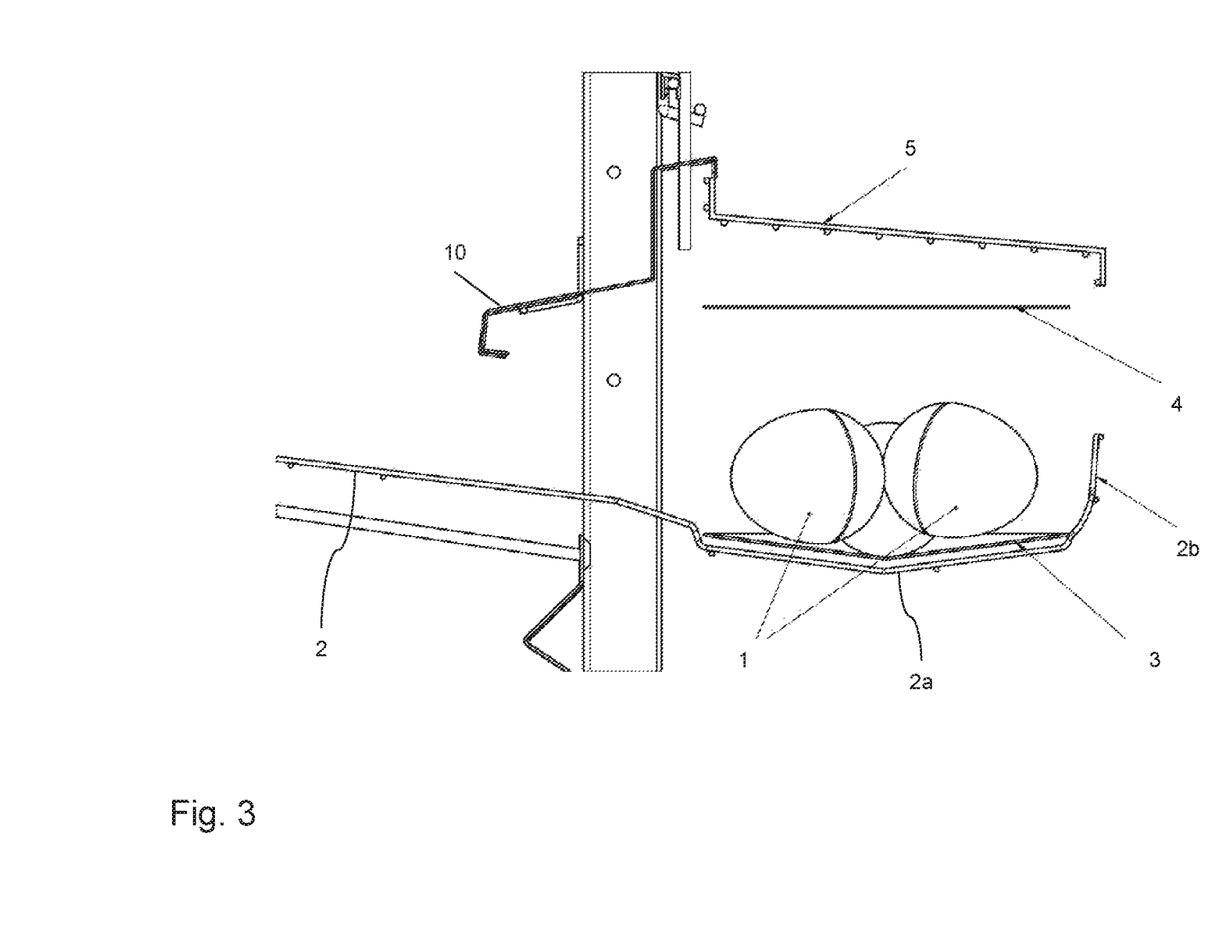
FIG. 3 is a magnified detail of FIG. 2.

As referenced in the Figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale. FIGS. 1-3 show a part of the poultry management system 200 with several animal holding areas 12 with a holding area floor and a conveyor 100.

Figure 4:
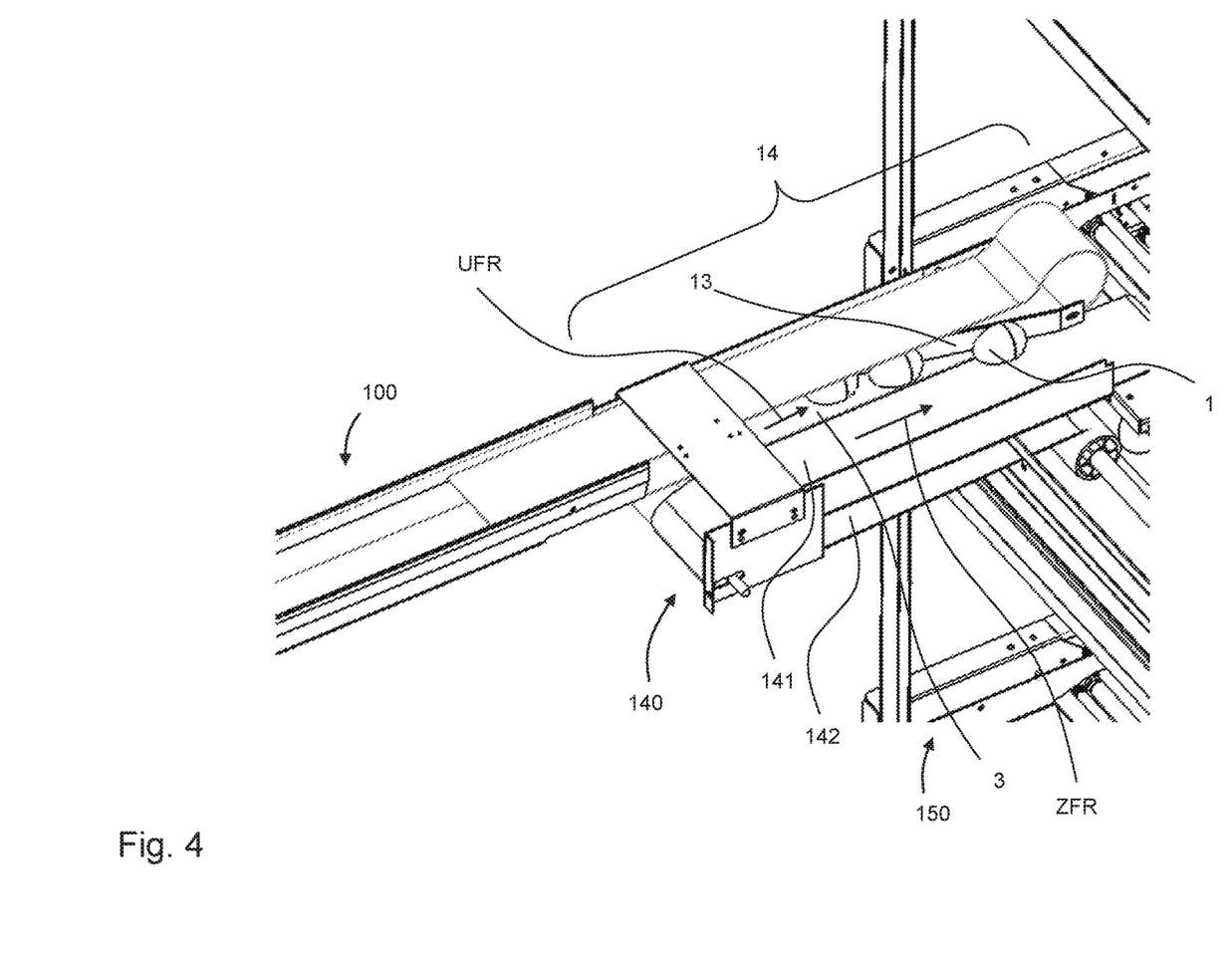
FIG. 4. is a three-dimensional view of an exemplary embodiment of an intermediate conveyor.
Figure 5:
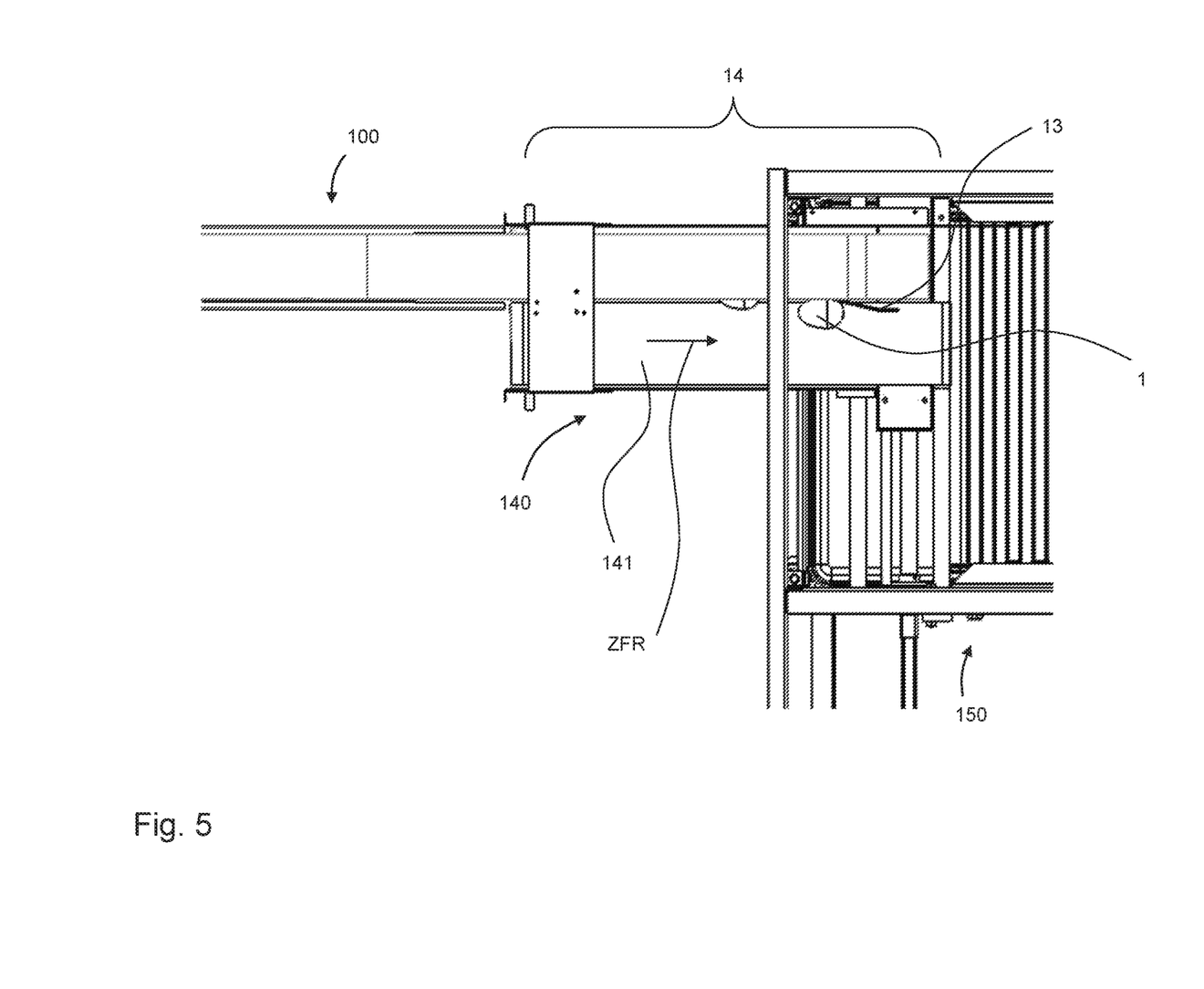
FIG. 5 is a top view of the intermediate conveyor according to FIG. 4.

FIGS. 4 and 5 show a conveyor 100, namely with the end located upstream in its lower belt transport direction UFR, where a transfer section 14 is arranged. Next, FIGS. 4 and 5 show an adjacent intermediate conveyor 140 which ensures the transport of the eggs 1 from the conveyor 100 to a subsequent conveyor 150.

Identical elements or elements with essentially the same function are labelled in the Figures with the same reference numbers.

As can be seen to some extent in FIG. 1, several animal keeping areas 12 may be arranged in a row next to each other with a conveyor 100 running parallel to them. As can be seen in FIG. 2, the embodiment of a poultry management system 200 shown therein only has a one-level design. However, a corresponding multi-level arrangement of animal holding areas 12 on top of each other is possible. A scrabbling space 9 which is preferably covered with litter is arranged at the house floor.

The conveyor 100 has an upper belt 4 and a lower belt 3. On the lower belt 3, eggs 1 are transported, namely in a lower belt transport direction UFR which is opposite to an upper belt transport direction OFR. At the end of the conveyor 100, a deflection or drive element 11 is arranged between the lower belt 3 and the upper belt 4.

As can be seen especially in FIG. 2, roosts 8, a feed supply 6 and a water supply 7 are arranged in the animal holding area 12.

A side wall 2b is arranged on a side of the lower belt 3 facing away from the animal holding area 12. Furthermore, a support element 2a is arranged below the lower belt 3. The side wall 2b and the support element 2a are designed as a grating element, in this case, as grating with crossed bars, and form one piece with the holding area floor 2. The side wall 2b serves, in particular, the purpose of preventing eggs 1 rolling from the (as can be seen in FIG. 2) slanted holding area floor 2 onto the lower belt 3 from rolling out of the egg channel.

As can furthermore be seen in FIG. 2, in particular, the lower belt 3 is arranged slightly below the level of the holding area floor 2, in particular, slightly below the end of the holding area floor 2 which is facing towards or, respectively, adjacent to the conveyor 100. The maximum clear distance in an essentially vertical direction between the upper belt 4 and the lower belt 3 corresponds preferably to no more than three times the average egg diameter, preferably to no more than twice the average egg diameter.

If the animals want to leave or enter the animal holding area 12, they will usually have to cross over the conveyor 100. To this end, a poultry holding element 5 is provided, which, in the embodiment of the poultry management system 200 shown in FIGS. 1-3 is, in particular, arranged as a grating with crossed bars. The poultry holding element 5 accessible to poultry is designed in such a way that poultry manure can reach the upper belt 4. Thus, the grating element of the poultry holding element 5 remains relatively clean and hygienic, which benefits the health of the balls of the feet of the animals. Furthermore, the poultry holding element 5 is provided with a step element 10 towards the animal holding area 12, which facilitates the exit of the animals from the animal holding area 12 via the poultry holding element 5.

Any manure on the poultry holding element 5 can be transported in the upper belt transport direction and, for example, be passed on (directly or indirectly) to a manure drying tunnel.

As shown in FIGS. 4 and 5, at the end of the conveyor 100 downstream in the lower belt transport direction UFR, in a transfer section 14, the eggs 1 are transferred onto an intermediate conveyor 140. This is achieved by means of a guiding element 13, which is designed and arranged to transport eggs 1 transported on the lower belt 3 out of the conveyor 100. The intermediate conveyor 140 is designed as a continuous conveyor with an upper belt 141 and a lower belt 142. The upper belt 141 of the intermediate conveyor 140 is essentially at the same height as the lower belt 3 of the conveyor 100. Thus, by means of the guiding element 13, the eggs 1 can move at an angle to the lower belt transport direction UFR over the side of the lower belt 3 of the conveyor 100 onto the upper belt 141 of the intermediate conveyor 140. From the intermediate conveyor 140, the eggs 1 then reach a subsequent conveyor 150, via which the eggs 1 are transported to where they are further used and/or processed.

Figure 6:
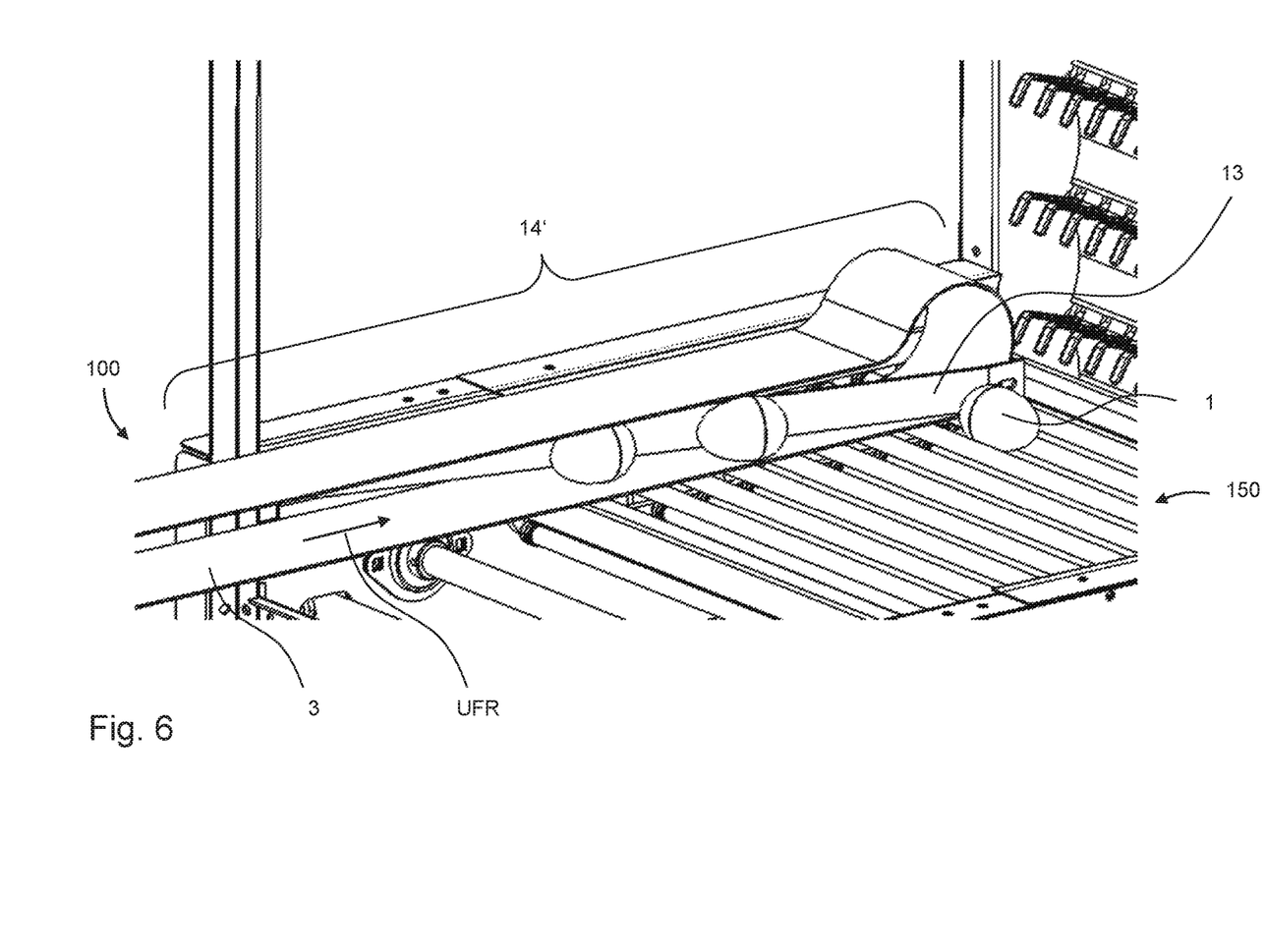
FIG. 6 is a three-dimensional view of another exemplary embodiment of a transfer section with a direct transfer onto a subsequent conveyor.

FIG. 6 shows a version in which, by means of the guiding element 13, eggs 1 are directly transferred laterally to the lower belt transport direction UFR from the conveyor 100 to a subsequent conveyor 150, which is arranged directly or slightly below the lower belt 3. Thus, an intermediate conveyor is not necessary. In the direction orthogonal to the lower belt transport direction UFR, in particular in the horizontal direction, the subsequent conveyor 150 is wider than the lower belt 3 and extends beyond the side of the lower belt. It is particularly advantageous for a smooth transfer of the eggs in the transfer section 14' that, as shown in FIG. 6, there is no gap in the horizontal direction between the subsequent conveyor 150 and the lower belt 3, or, if, for example, a subsequent conveyor or an intermediate conveyor is arranged adjacent to the lower belt 3, a horizontal distance between the subsequent conveyor or the intermediate conveyor and the lower belt 3 is dimensioned in such a way that no egg can fit through or get stuck in this gap.

The use of the lower belt 3 of the conveyor 100 for receiving and transporting eggs 1 and the use of the upper belt 4 of the conveyor 100 for receiving and transporting manure have several advantages. First of all, the upper belt 4 protects the eggs transported on the lower belt 3 from being contaminated and/or damaged. Furthermore, the manure on the upper belt 4 can be transported away regularly, which improves the house hygiene. All in all, this leads to a design which is compact, saves costs and improves the house hygiene.

It will be understood by one having ordinary skill in the art that construction of the described present disclosure and other components is not limited to any specific material. Other exemplary embodiments of the disclosure disclosed herein may be formed from a wide variety of materials, unless described otherwise herein.

For purposes of this disclosure, the term "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that many modifications are possible, e.g., variations in sizes, dimensions, structures, shapes and proportions of the various elements, values of parameters, mounting arrangements, use of materials, colors, orientations, etc. without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure and method without departing from the concepts of the present disclosure, and further it is to be understood that such concepts are intended to be covered by the following claims unless these claims by their language expressly state otherwise.

The invention claimed is:

1. A poultry management system comprising;
at least one animal holding area with a holding area floor for a poultry animal occupying the animal holding area; and
a conveyor comprising a conveyor belt having an upper track and a lower track disposed below the upper track;
wherein the lower track is disposed adjacent to the at least one animal holding area and receives one or more eggs deposited by the poultry animal occupying the animal holding area and transfers the one or more eggs for further processing;
wherein the one or more eggs is transported on an upper surface of the lower track in a lower track transport direction, wherein the upper surface of the lower track is textured to receive the one or more eggs; and
wherein poultry manure is transported on an upper surface of the upper track in an upper track transport direction, wherein the upper surface of the upper track is essentially smooth.

2. The poultry management system according to claim 1, wherein the upper surface of the upper track is configured to receive poultry manure.

3. The poultry management system according to claim 2, wherein a poultry holding element is arranged above the upper track, and wherein at least a portion of the poultry holding element comprises a grating through which the poultry manure can reach the upper surface of the upper track.

4. The poultry management system according to claim 1, wherein a side wall is arranged on a side of the lower track distanced away from the at least one animal holding area.

5. The poultry management system according to claim 1, wherein a support element is arranged below the lower track.

6. The poultry management system according to claim 5, wherein a side wall is arranged on a side of the lower track distanced away from the at least one animal holding area and is supported by the support element.

7. The poultry management system according to claim 1, wherein an upper surface of the lower track is arranged at or below the height of an upper surface of the holding area floor.

8. The poultry management system according to claim 1, wherein the one or more eggs comprises a predetermined species of poultry and a distance in an essentially vertical direction between the upper track and the lower track corresponds to no more than three times the average egg diameter of the predetermined species of poultry.

9. The poultry management system according to claim 1, further comprising a guiding element which is configured to transport eggs transported on the lower track out of the conveyor.

10. The poultry management system according to claim 9, further comprising an intermediate conveyor which is configured to receive eggs transported out of the conveyor.

11. The poultry management system according to claim 10, wherein the intermediate conveyor has a transport direction which is essentially parallel to the lower track transport direction, and wherein the intermediate conveyor comprises an intermediate conveyor belt with an upper track and a lower track.

12. The poultry management system according to claim 11, wherein an upper surface of the upper track of the intermediate conveyor is arranged essentially at the same height or slightly below an upper surface of the lower track of the conveyor; and
wherein the one or more eggs comprises a predetermined species of poultry and a distance between the intermediate conveyor and the conveyor is smaller than an average egg diameter of the predetermined species of poultry.

13. The poultry management system according to claim 12, wherein the distance between the intermediate conveyor and the conveyor is the distance between the upper track of the intermediate conveyor and the lower track of the conveyor.

14. The poultry management system of claim 12, wherein the distance is smaller than 50% of the average egg diameter of the predetermined species of poultry.

15. The poultry management system of claim 12, wherein the distance is smaller than 20% of the average egg diameter of the predetermined species of poultry.

16. The poultry management system according to claim 10, wherein the intermediate conveyor has a transport direction which is essentially parallel to a lower track transport direction; and
wherein the intermediate conveyor comprises an intermediate conveyor belt arranged as a rod conveyor.

17. The poultry management system according to claim 1, wherein the upper surface of the upper track is designed differently from an upper surface of the lower track.

18. The poultry management system according to claim 1, wherein the one or more eggs comprises a predetermined species of poultry and a distance in an essentially vertical direction between the upper track and the lower track corresponds to no more than twice the average egg diameter of the predetermined species of poultry.

19. A method of transporting eggs in a poultry management system comprising at least one animal holding area with a holding area floor for a poultry animal occupying the animal holding area, and a conveyor comprising a conveyor belt having an upper track and a lower track disposed below the upper track, wherein the lower track is disposed adjacent to the at least one animal holding area and is adapted to receive one or more eggs deposited by the poultry animal occupying the animal holding area and transfer the one or more eggs for further processing, the method comprising the steps of:
transporting the one or more eggs on an upper surface of the lower track in a lower track transport direction; and
transporting poultry manure on an upper surface of the upper track in an upper track transport direction.

20. The method of claim 19, wherein the lower track of the conveyor is adapted to receive the one or more eggs from the animal holding area.

* * * * *